Feb. 11, 1958    H. V. L. REGNAULT    2,822,863
SUPPORT MOUNTED SCREW ACTUATED TIRE BEAD BREAKING DEVICE
Filed Dec. 14, 1954    2 Sheets-Sheet 1
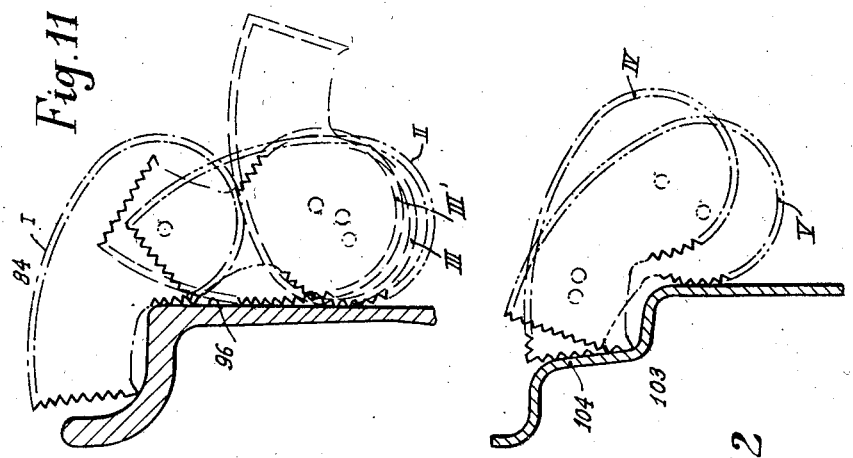
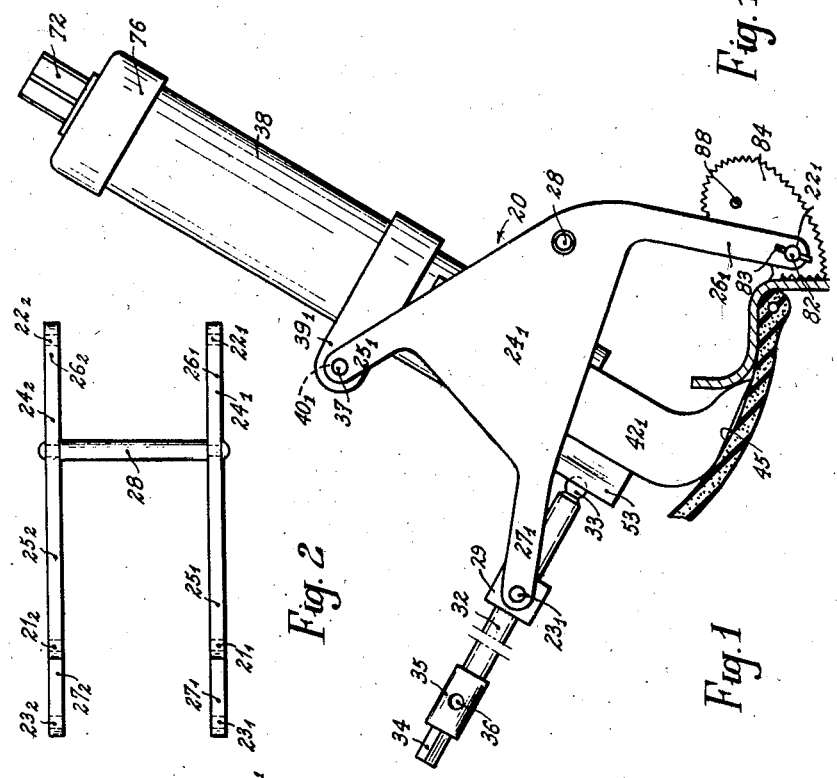
INVENTOR
HENRI, VICTOR, LEON REGNAULT
BY

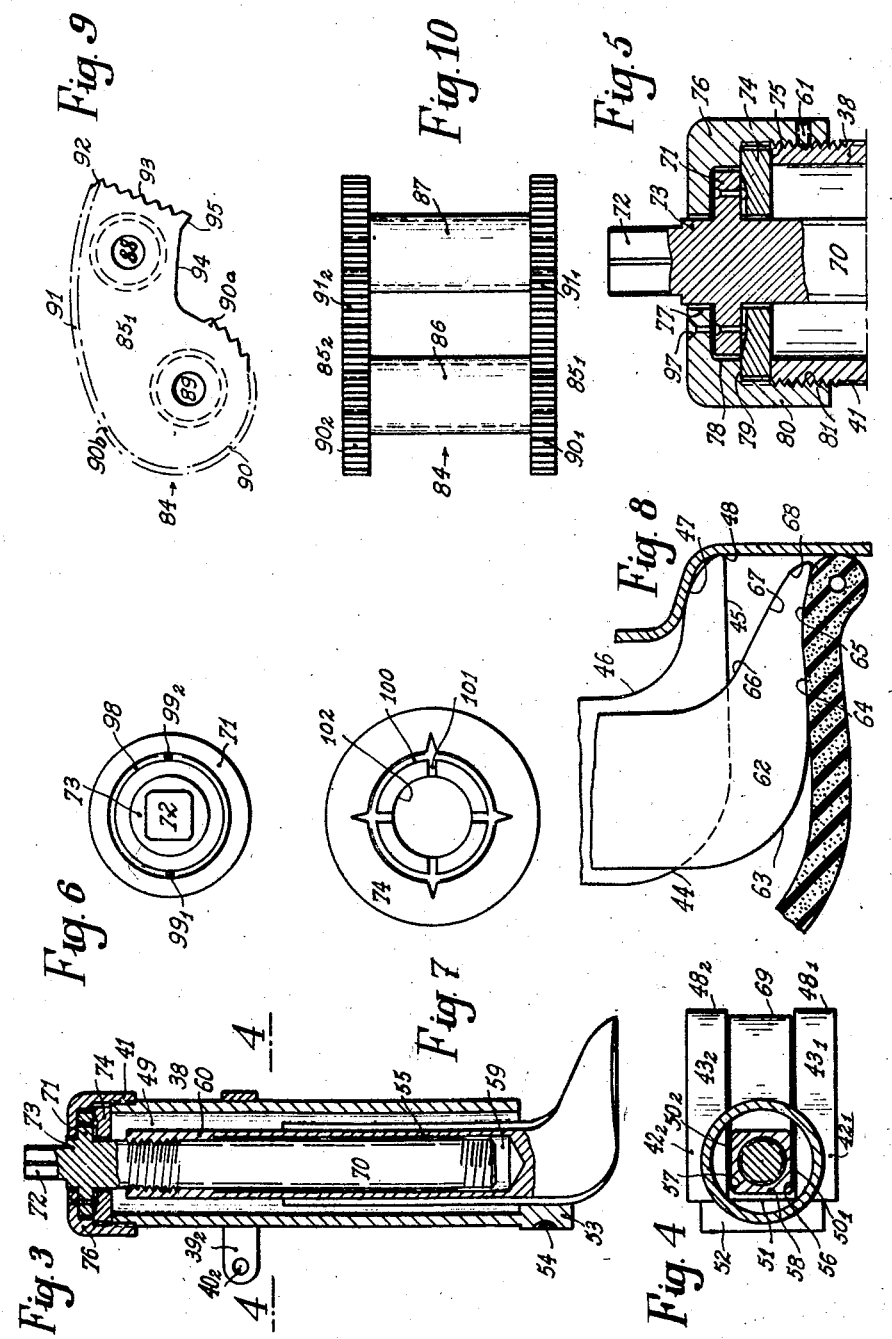

United States Patent Office 2,822,863
Patented Feb. 11, 1958

2,822,863

SUPPORT MOUNTED SCREW ACTUATED TIRE BEAD BREAKING DEVICE

Henri V. L. Regnault, Boulogne-sur-Seine, France, assignor of one-half to Paulette Chedal, Paris, France Application December 14, 1954, Serial No. 475,179

Claims priority, application France October 22, 1954

3 Claims. (Cl. 157—1.17)

This invention relates to a tool for removing a tire from the wheel of an automotive vehicle. It is well known that such removal involves considerable difficulty especially in connection with large size tires and more particularly in cases where the wheel rim is rusty. Devices heretofore suggested for this purpose usually have been very bulky, heavy and met the desiderata of only a small group of customers. Other more lightweight types of devices yielded poor results in practice. Moreover, all such known types of devices generally involved the use of a hammer or equivalently acting mass for inserting the members used for separating the tire from the rim.

The invention on the other hand provides a tool that is lightweight yet rugged, adapted to be easily and quickly inserted in position without the use of a hammer or the like, reliably ensures separation and removal of a tire from a wheel rim under all conditions, and is simple and economical to make.

It moreover is adaptable for use with all types and sizes of wheel rims in current use, regardless of their diameter and cross sectional shape, so that a single unit will be applicable for use under practically all conditions that may be encountered.

In the ensuing description, made by way of example, reference is made to the accompanying drawings wherein:

Fig. 1 is an illustration of apparatus according to the invention in the initial stage of its operation;

Fig. 2 is a plan view of the frame or support;

Fig. 3 is an axial, partly sectional view of the main body section of the device;

Fig. 4 is a section on line 4—4 of Fig. 3;

Fig. 5 is a sectional view of the upper part of the main body on an enlarged scale;

Fig. 6 is a plan view of the upper part of the body with the cover removed;

Fig. 7 is a plan view of a washer;

Fig. 8 shows the bottom parts of the leg members during the stage of separation of the tire from the rim;

Fig. 9 is an elevational view of a blocking member or heel;

Fig. 10 is a corresponding view in plan;

Fig. 11 shows part of a wheel rim with the blocking member shown in various positions relative thereto;

Fig. 12 is a similar view similar to Fig. 11 but relating to a different type of wheel rim; and Fig. 13 is a detail.

In the embodiment illustrated, a tool according to the invention comprises a generally triangular supporting frame 20 defining three lines of bearings provided by three pairs of aligned holes $21_1$—$21_2$, $22_1$—$22_2$, and $23_1$—$23_2$ arranged at the apexes of a substantially isosceles triangle wherein the equal sides are $21_1$—$22_1$ (or $21_2$—$22_2$) and $23_1$—$22_1$ (or $23_2$—$22_2$), while the remaining side or base of the triangle is substantially equal in length to two thirds of the equal sides. This support comprises a pair of spaced plates or flanges $24_1$, $24_2$ having extensions $25_1$, $26_1$ and $27_1$ and $25_2$, $26_2$ and $27_2$, respectively, projecting therefrom. Rigidity is imparted to this supporting frame by a spacer member 28 and a cross member 29 mounted for rotation about its ends $30_1$ and $30_2$ in holes $23_1$ and $23_2$. The cross member 29 is formed with a transversely extending tapped aperture 31 cooperating with a threaded rod 32 constituting thrust means and having one of its ends formed into a spheroidal appendage 33 and its other end terminating in a square 34 beyond a smooth section 35 of the rod, which section is formed with an eye at 36.

Rotatably mounted in holes $21_1$ and $21_2$ by means of a pivot 37 is a jack structure which includes a tubular body member 38 provided for the purpose of its pivotal mounting with a pair of ears $39_1$ and $39_2$ formed with holes $40_1$ and $40_2$. The upper part of the body is threaded at 41. Projecting from the lower end of the body member are a pair of side legs $42_1$ and $42_2$ rigidly secured thereto or integrally formed therewith as by casting or forging. The legs terminate at their lower ends as curved tapered claws or beaks $43_1$ and $43_2$ respectively. Each claw is formed with a rear rounded portion 44 extended by a substantially flat face 45 which very slightly rises with respect to the horizontal plane to the rounded portion 44 normal to the axis of the body. The upper face of each claw presents a concave portion 46 followed by a convex portion 47 which is drooping in direction and intersects the flat face 45 to define the forward edges or arrises $48_1$ and $48_2$ of the beaks or claws. The body member defines within it a generally cylindrical cavity 49 formed with parallel flats $50_1$ and $50_2$ in its lower part. Another flat 51 perpendicular thereto is defined by a plate or strip 52 interconnecting the legs $42_1$ and $42_2$ and formed on its rear face 53 with a spherical bearing surface 54.

Slidably mounted within the cavity 49 is a central leg 55 substantially square in cross section and the side faces 56 and 57 thereof cooperate with the flats $50_1$ and $50_2$ while rear face 58 cooperates with the flat 51. The central leg 55 is formed throughout the major part of its extent with a cylindrical bore 59 having a tapped upper end 60. This centre leg terminates at its lower end with a beak or claw 62 the under face of which has a rounded portion 63 extended by a portion 64 having a very slight curvature, terminating in an end portion 65 curved in the opposite direction. The upper face of the claw 62 has a rounded portion 66, followed by a nearly-flat portion 67 and finally an end portion 68 having a short radius of curvature such that the end surface of the claw is substantially vertical. The length of the claw 62 is such that with the leg in position in the body 38 the straight arris 69 is displaced slightly to the rear of the arrises $48_1$ and $48_2$ of claws $43_1$ and $43_2$.

Housed within the bore 59 is a rod 70 threaded throughout its length and having at its top an annular projecting flange 71 and beyond that a shoulder 73 followed by a square end section 72. A washer 74 is interposed between the flange 71 and the upper wall 75 of the bore in the body 38. The body 38 has a cover 76 secured to it, the cover being formed with a cylindrical aperture 77 through which the shoulder 73 extends, a step 78 for accommodating the flange 71 and another step 79 for accommodating washer 74. The lower end of the body 80 of the cover is internally threaded at 81 for cooperating with the screw threads 41. The various shoulders, the flange and the depths of the steps are so dimensioned that with the cover 76 screwed home on to the body 38, the washer 74 is blocked between the upper end face 75 of the body 38 and the bottom end wall of step 79 formed in the cover. A set screw 61 is provided for blocking the cover on the body 38 in this condition. On the other hand, the thickness of flange 71 is slightly less than the step 78 so that when the threaded rod 70 rotates, the two flat faces of flange 71 will move respectively over the surface of washer 74 and the transverse face of step 78. A lubricating hole 97 is provided in the cover 76 and the lubricant introduced therethrough will lubricate the contacting upper surface of flange 71 and the cover; moreover, the lubricant will flow through a groove 98 and ports $99_1$ and $99_2$ formed in the flange 71 on to the surface of contact between the shoulder mentioned above and the washer 74, there being a groove 100 formed in the upper surface of the washer as well as radial cutouts 101 therein which open into the central bore 102 in the washer for ensuring lubrication of the screw threads of rod 70.

Mounted for rotation by means of extensions $26_1$ and $26_2$ on a shaft 82 extending through holes $22_1$ and $22_2$ and removably secured by means of a pin 83 is a fulcrum or pressure member 84 clearly illustrated in Figs. 9 and 10. This member comprises a pair of flanges $85_1$ and $85_2$ interconnected by tubular spacers 86 and 87, which surround apertures 88 and 89 through either one of which the shaft 82 may be passed as desired. Each flange is so contoured as to comprise a substantially circular cam or bearing surface portion 90, slightly eccentered with respect to the axis of aperture 89, that is, a vector radius extending from the end $90_a$ of the part 90 and rotated about the axis of aperture 89 until it has reached the other end $90_b$, would have a length that progressively increases during such rotation. This substantially circular portion 90 is extended by a cam or bearing surface portion 91 having a substantially longer radius of curvature and merges over a flat portion 92 with a substantially straight portion 93 extending at an angle of about 90° to the adjacent portion of part 91. The part 93 connects with part 90 over a substantially straight part 94 which extends parallel to the opposite portion in part 91. A small projection 95 is formed at the connection between parts 94 and 93. Parts 90, 91 and 93 are preferably serrated in the manner shown.

The device operates as follows:

The pressure member or heel 84 is disposed on the triangular supporting frame 20 between extensions $26_1$ and $26_2$, in a position corresponding to the shape of the wheel rim bearing the tire to be removed. One of four different conditions may occur. Thus, the fulcrum or pressure member may be mounted with the pin 82 extending either through aperture 88 or through aperture 89; in either case moreover, it may be mounted either with its flange $85_1$ adjacent to extension $26_2$ or with its other flange $85_2$ adjacent said extension. Practically this makes it possible to adapt the device for use with all types and all sizes of wheelrims in current use, both where the rim is or is not provided with a stepped bead or flange. With heel 84 resting on the inner face 96 of a rim, the edges $48_1$, 69 and $48_2$ of claws $43_1$, 62 and $43_2$ are presented adjacent the joint between the bead of the tire and the rim portion with which said bead is in engagement. For this purpose the legs $42_1$, 55 and $42_2$ are disposed obliquely as visible in Fig. 1, in order to facilitate insertion. Then threaded thrust rod 32 is actuated as by acting on square 34 or by means of a bar inserted through perforation 36. In this movement, as a result of the cooperation between spherical head portion 33 and the complementarily shaped seat 54, the lower ends of the legs are progressively caused to move back by rocking about the axis 37 of support 20, which latter takes support through member 84 as a fulcrum against the rim. As the legs on the one hand and the heel 84 on the other, are progressively moved towards one another pincerwise, the heel is rocked about its axis 82 and because of its shape, particularly its eccentrical contour, such rocking movement produces a wedging action which is further increased owing to the provision of the serrations on the edges of flanges $85_1$ and $85_2$ of the heel. This operation is continued until the axis of tubular body member 38 and with it the legs, have assumed a substantially vertical position, i. e., parallel to the base of the wheel rim. In this condition the heel 84 cooperates with the claws provided at the ends of the legs to provide an exceedingly firm connection between the tool and the wheelrim. Fig. 11 shows by way of example a few typical positions which heel 84 may assume in exerting this blocking action. In the position shown at I and II, the aperture used for mounting the heel is aperture 89. In other positions the aperture may be aperture 89 or aperture 88. Illustrated at III is an initial position of heel 84 and at III' is shown the corresponding final position, in which the heel is blocked with the rim. Fig. 12 illustrates two different positions IV and V of heel 84 for securing the tool with a rim 103 of the type including a stepped flange or bead 104.

The operator then actuates the jack device constituted by threaded rod 70 and cooperating nut-like tapped or threaded portion 60, by using a key or wrench positioned around the square 72. In such action, the threaded rod being prevented from moving longitudinally owing to its being held between the washer 74 blocked by member 38 on one side, and cover 76 on the other, as previously described, gradually advances the centre leg 55 downwardly, by reason of the nut-like internal threading 60 provided therein. The leg is guided in its sliding movement by the flats $50_1$, $50_2$ and 51. In this way the side of the tire against which the leg reacts by means of the under face 64 of the claw 62 thereof (Fig. 8) is progressively pushed away. It is to be noted that the curved contour of the end part of claw 62 acts to move the bead away from the bottom of the rim. Moreover the fact that arris 69 of the centre claw 62 is displaced rearward from the arrises $48_1$ and $48_2$ of the side claws $43_1$ and $43_2$, and is constrained to move in a path substantially parallel to the rim base, ensures that during its displacement the centre claw will not rub against the bottom surface of the rim. Such rearward displacement of the centre claw at the same times makes allowance for the circular shape of the rim. The operation is continued until the part of the tire adjacent to the point in which the tool is inserted has been sufficiently depressed. If necessary, the operation may be repeated at another location of the tire, after first having inserted a shim into the depression already formed at the first point, as in a conventional tire-removing operation.

Because the mechanical jack device is provided on the leg, the vertical dimension of the tool may be held down to a minimum. Since the threaded rod is not moved longitudinally it may be permanently mounted in the tubular body so that its screw threads are protected against damage.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. Apparatus for removing a tire from a vehicle wheel rim, comprising supporting means defining first, second and third substantially parallel pivot axes located, respectively, at the apexes of a substantially isosceles triangle having a base with said first and second axes defining the opposite ends of said base, jack means carried by said supporting means for pivotal movement about said first axis located at one end of said base of said triangle, said jack means being provided with rim-engaging means and with tire-engaging means actuable for separating said tire from said rim, thrust means carried by said supporting means for pivotal movement about said second axis located at the other end of said base of said triangle, said thrust means being provided with means for engaging said jack means and arranged for reciprocal movement substantially at right angles to said pivot axes for effecting said pivotal movement of said jack means about said first axis, and pressure means carried by said supporting means for pivotal movement about said third axis and provided with eccentric contact surface means arranged to coact with said rim-engaging means to grip said rim and enable said tire to be removed from said rim upon actuation of said tire-engaging means, said contact surface means including a first arcuate surface portion having a predetermined eccentric curvature, and a second arcuate surface portion having a different predetermined eccentric curvature and constituting a continuation of said first surface portion, said second surface portion having a greater radius of curvature than said first surface portion.

2. Apparatus according to claim 1, the extremities of said first and second surface portions remote from one another being joined to one another by a substantially rectilinear surface portion.

3. Apparatus according to claim 1, said contact surface portions being provided with a plurality of teeth engageable with said wheel rim, the rim-engaging parts of said teeth extending substantially parallel to said pivot axes.

References Cited in the file of this patent

UNITED STATES PATENTS

| | | |
|---|---|---|
| 1,475,519 | Snider | Nov. 27, 1923 |
| 2,293,467 | Kenworthy | Aug. 18, 1942 |
| 2,479,432 | Tillotson | Aug. 16, 1949 |
| 2,520,330 | Northrup et al. | Aug. 29, 1950 |
| 2,581,086 | Edenfield et al. | Jan. 1, 1952 |
| 2,682,298 | Manupello | June 29, 1954 |

FOREIGN PATENTS

| | | |
|---|---|---|
| 1,058,360 | France | Mar. 16, 1954 |